United States Patent [19]

Hoopes et al.

[11] 4,099,114
[45] Jul. 4, 1978

[54] SERVO STOP SYSTEM

[75] Inventors: Howard Sherman Hoopes, Hilltown; Thomas Joseph Walsh, Hatboro, both of Pa.

[73] Assignee: Leeds & Northrup Company, North Wales, Pa.

[21] Appl. No.: 736,924

[22] Filed: Oct. 29, 1976

[51] Int. Cl.² .............................................. G05B 11/01
[52] U.S. Cl. ....................................... 318/676; 346/32
[58] Field of Search ............... 318/676, 678, 608, 609, 318/591, 611, 612, 446, 635, 566; 346/31, 32

[56] References Cited

U.S. PATENT DOCUMENTS

| | | | |
|---|---|---|---|
| 3,201,675 | 8/1965 | Curran et al. | 318/635 |
| 3,523,193 | 8/1970 | Hutcheon | 318/609 |
| 3,652,913 | 3/1972 | Leland | 318/678 |
| 3,662,275 | 5/1972 | Riley | 318/591 X |

*Primary Examiner*—Robert K. Schaefer
*Assistant Examiner*—John J. Feldhaus
*Attorney, Agent, or Firm*—Raymond F. MacKay; William G. Miller, Jr.

[57] ABSTRACT

A servo system is disclosed which produces a mechanical position varying in accordance with variations in an electrical input signal. The input signal is applied by an amplifying channel to one input of an error amplifier. The input signal amplifying channel includes an integrating amplifier and a voltage limiting device at the input to the integrating amplifier so that the signal applied to the error amplifier has a limited rate of change. A negative feedback gain determining loop is included in the amplifying channel so that at balance the signal applied to the error amplifier is directly related to the input signal. Applied to the other input of the error amplifier is a signal representative of the positional output from the servo system to form a second rebalanceable loop system. A switched stop circuit is connected from the output of the error amplifier to the input of the integrating amplifier to permit the servo system to be stopped and subsequently to restore the system to normal operation with the rate of change of position of the servo limited by the integrating amplifier.

8 Claims, 1 Drawing Figure

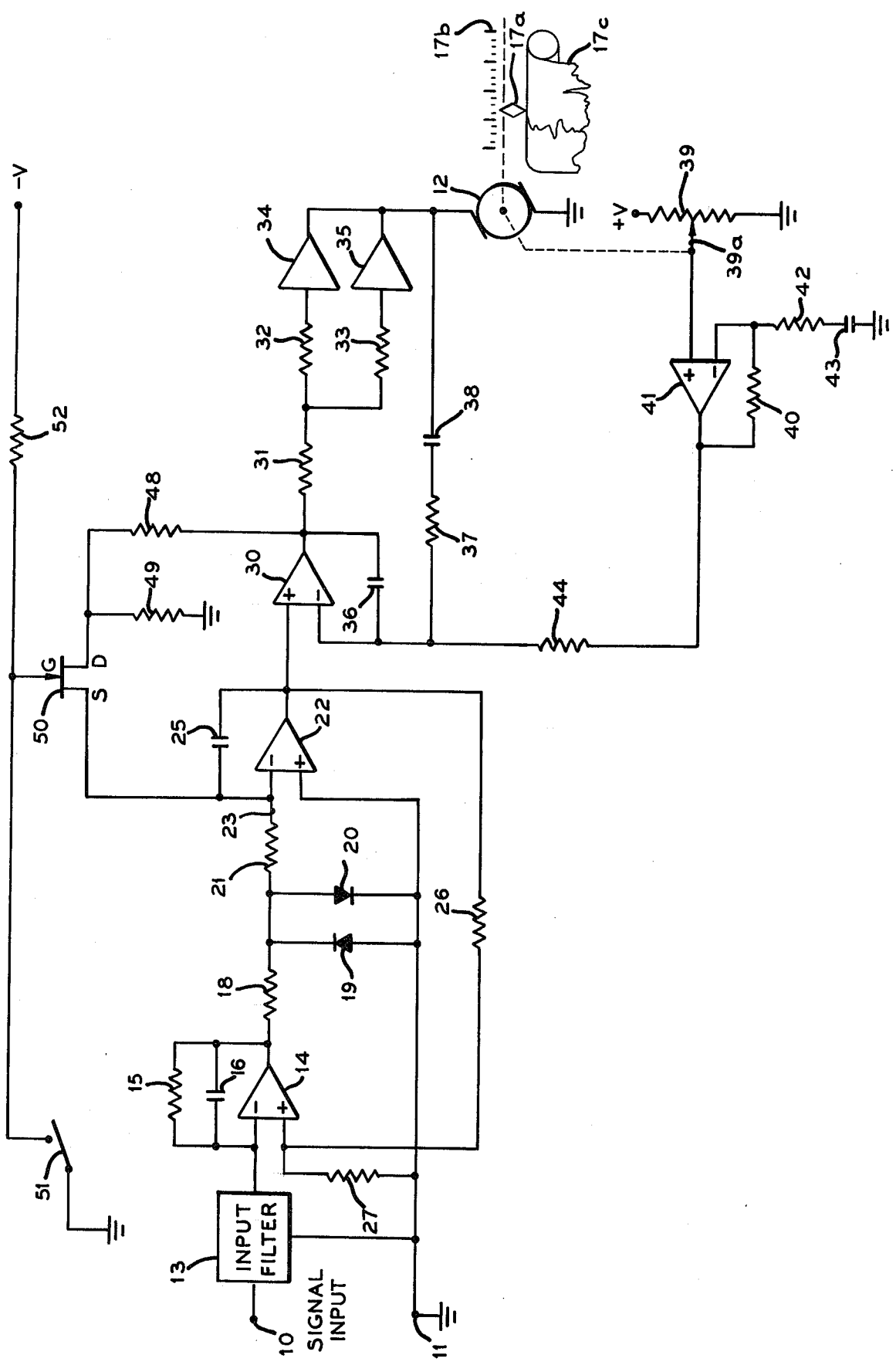

SERVO STOP SYSTEM

BACKGROUND OF THE INVENTION

This invention relates to improved stop circuits for rebalanceable servo systems and particularly to systems of the type that are used in null balance recorders wherein the position of a pen and pointer combination is varied in accordance with the magnitude of an input signal.

In general the prior art has employed stop circuits in servo systems of this type in which the error signal amplifier, or its counterpart, was disconnected from the balancing motor or in some other way was made inoperative to control the balancing motor. Inherent in such a system is the problem that when the servo system is returned to its normal operating condition the balancing motor then operates at its full speed capability to restore the servo system to balance. Such high speed operation is undesirable as it may result in undesirable overshooting of the balance point. With the present invention such problems are avoided by maintaining the error signal at substantially zero throughout the period that the servo system is stopped. By virtue of a feedback connection from the error amplifier output to the integrating amplifier the error signal is restricted to a predetermined rate of change when the servo system is returned to its normal operating condition. While this invention has utility in positional type servo systems in general it finds particular utility in rebalanceable servo systems used with rebalanceable graph marking recorders and particularly with high speed multipoint industrial recorders wherein the servo system must be periodically interrupted or placed into a stopped condition during the time that the data for a particular point is being printed on the recorder chart in avoidance of smearing of the printed point.

It is thus an object of this invention to provide a stop circuit for a positional rebalanceable servo system that limits the rate at which the system is restored to balance after its operation has been interrupted by a stop circuit.

It is a further object of this invention to limit the rebalancing rate of the servo system to a preselected rate.

BRIEF DESCRIPTION OF THE DRAWING

The single FIGURE is a schematic diagram of a rebalanceable positional type servo system.

DESCRIPTION OF THE PREFERRED EMBODIMENT

As illustrated in the FIGURE, input signal terminals 10 and 11 are to be connected to a source of electrical input signals not shown, for control of the position of the servo balancing motor 12 and the pointer and pen 17a associated with scale 17b and chart 17c. Input terminal 11 has been shown as connected to ground which may be taken as a common signal connection or chassis ground. A low pass input filter 13 is connected in circuit with the input signal terminals 10 and 11 to remove any undesired signals that may be applied to the input terminals by electromagnetic pickup and which are not related to the input signal applied to the terminals 10 and 11. Generally, such signals are picked up from power supply lines and are at that frequency or multiples thereof. The filtered input signal is then applied to the inverting input of a differential comparator amplifier 14. Shown connected in a negative feedback connection from the output of the comparator amplifier are a resistor 15 and a capacitor 16 to provide a negative feedback around the differential amplifier 14. This negative feedback serves to stabilize the circuit against high frequency oscillations which if not eliminated would result in the servo system having a deadband because the high frequency signal would tend to saturate the input stage of amplifier 14.

The output from comparator amplifier 14 is applied by way of a resistor 18 to a pair of diodes 19 and 20 connected in back-to-back relation. These diodes serve as a bidirectional limiter to limit the voltage between the output of resistor 18 and circuit common to the magnitude of the voltage necessary to produce conduction in the diodes, which is approximately 0.6 volts. This limited voltage is applied to an integrating circuit consisting of an integrating resistor 21, a differential amplifier 22 and an integrating capacitor 25. The output from the integrating amplifier 22 is fed back to the non-inverting input of the comparator amplifier 14 through a divider network comprised of resistors 26 and 27 which together determine the gain of the input signal amplifying channel which includes comparator amplifier 14 and integrating amplifier 22.

The circuit thus far described is an input signal integrating amplifying loop which will upon application of a signal voltage to input signal terminals 10 and 11 drive comparator amplifier 14 to saturation to cause one or the other of diodes 19 and 20 to conduct and produce across them a voltage limited to the diode conduction voltage. This fixed voltage produces at the output of integrating amplifier 22 a ramp type voltage change that increases with time until the voltage at the output of integrating amplifier 22 reduced by the resistors 26 and 27 and applied to the non-inverting input terminal of differential comparator amplifier 14 is equal in magnitude to the input signal at the inverting input of amplifier 14. At that time the input channel is restored to a balanced condition and the output from integrating amplifier 22 is proportional in magnitude to the input signal.

It will be obvious to those skilled in the art that the overall gain of the input amplifying channel is determined by the relative magnitude of the resistors 26 and 27 and may be changed by varying the relative resistances of these resistors. Also, the magnitude of resistor 21 may be adjusted or preselected to predetermine the rate of change of the signal at the output of integrating amplifier 22 and in turn the rebalancing speed of the servo motor 12.

The output voltage from integrating amplifier 22 is applied to the non-inverting input of differential error amplifier 30. The output from error amplifier 30 is applied through resistors 31, 32 and 33 to power amplifiers 34 and 35, respectively, whose outputs are connected to control the operation of servo motor 12. One power amplifier is used to provide energization of servo motor 12 for rotation in one direction while the other power amplifier is used for control of rotation in the opposite direction. It is to be understood, of course, that if error amplifier 30 has sufficient power gain that the power amplifiers 34 and 35 need not be used.

As shown, a capacitor 36 is connected in a negative feedback circuit from the output of differential error amplifier 30 to its inverting input terminal. This capacitor 36 provides error amplifier 30 stability over a wide range variation in the amount of gear backlash between servo motor 12 and measuring slidewire 39. Also connected to the inverting input of differential amplifier 30 are resistor 37 and capacitor 38 to provide a negative feedback path from the servo motor 12 to improve the damping of the servo system without creating a deadband by reducing the gain of the motor control loop composed of amplifiers 30, 34 and 35 during balancing time and allowing the gain to be very high at balance.

In order to provide a feedback from the position of the servo motor 12 there is provided a slidewire 39. Slidewire 39 is supplied from a constant voltage source +V and has its slider 39a relatively positioned with respect to the slidewire 39 by servo motor 12 so that there is developed at the slider 39a a signal voltage that varies in accordance with the position of servo motor 12. This voltage is applied to the non-inverting input of a differential slidewire buffer amplifier 41 which has a gain of unity by virtue of the feedback connection from its output to inverting input terminal by resistor 40. Additionally, the inverting input of amplifier 41 is connected to circuit common through resistor 42 and capacitor 43 to provide a lead signal to the feedback signal for damping of the servo motor 12. The output from amplifier 41 is applied through resistor 44 to the inverting input of differential error amplifier 30 to complete the rebalanceable motor control loop.

The rebalanceable servo system as described responds to a change in input signal at terminals 10 and 11 to develop a ramp type voltage at the non-inverting input of error amplifier 30 which in turn energizes servo motor 12. Servo motor 12 in response to the ramp signal applied to the error amplifier positions slider 39a to produce through slidewire buffer amplifier 41 a rebalancing signal at the inverting input of differential amplifier 30. The rate at which servo motor 12 adjusts the slider 39a is determined by the rate of change of the signal applied to the error amplifier 30 by the integrating amplifier 22. The integrating resistor 21 therefore determines the speed at which servo motor 12 operates. As described, the servo system is comprised of two separately rebalanceable loops connected with the output signal from the input signal integrating amplifying loop serving as the input signal to the rebalanceable motor control loop.

It is at times desirable to interrupt the operation of rebalanceable positional servo systems. With respect to servo systems used to operate industrial recorders, it is desirable to have this feature, for example, when it is necessary to change the chart paper on the recorder, or in the case of a multipoint recorder, to interrupt the rebalancing operation at the time that the magnitude of the value of the signal for any particular point is being recorded. While there are many different ways that can be employed to stop the balancing operation of a servo system, it is particularly desirable in recorder applications that during the time that the recorder is stopped, the circuit is held in such a state that when the recorder is again permitted to proceed in its rebalancing mode of operation that it does so without an excessive rate of travel.

The unique circuit used in this invention to stop the rebalancing operation of the servo system comprises a negative feedback path from the output from error amplifier 30 to input summing junction 23 of integrating amplifier 22. The establishment of the negative feedback path so reduces the system gain that the output from the error amplifier 30 will not be sufficient to produce operation of the servo motor 12. While the negative feedback circuit may take many different forms, the circuit, as shown in the FIGURE, is comprised of a resistor 48 and a resistor 49 connnected in series circuit. The junction between the two resistors is connected through the source-drain circuit of a switching FET 50 to the summing junction 23 of the integrating amplifier 22. The operation of the switching FET 50 is under control of a stop switch 51 and a resistor 52 connnected to the gate electrode of the FET 50. During the time that stop switch 51 is in its illustrated open position, there is applied to the gate electrode of switching FET 50 a negative voltage from the voltage source indentified as —V through the resistor 52. This voltage will maintain the switching FET in its high resistance state between its source and drain electrodes so that the negative feedback path from the output of error amplifier 30 to integrating amplifier 22 is interrupted.

When it is desired to stop the rebalancing operation of the servo system, switch 51 is operated to its closed position so that the gate electrode of switching FET 50 is grounded. The grounding of the gate electrode produces a low impedance path between the source and drain electrodes of switching transistor 50 to provide the negative feedback path from the output of error amplifier 30 to the summing junction 23 of integrating amplifier 22 to stop the rebalancing operation of the recorder during the time that the switch 51 is in its closed position. It is to be understood that while a simple on/off switch has been illustrated as the switch 51, that that switch may take any form and may itself be an optically operated switch or other type of solid state switch. Additionally, the switch may be manually operated or it may be automatically operated by mechanical or electrical means.

In addition to producing a low voltage at the output of error amplifier 30, the negative feedback path also maintains a fixed voltage across the integrating capacitor 25 of integrating amplifier 22, and thus retains a fixed output voltage from the integrating amplifier 22. It is by virtue of this maintaining of the fixed voltage that when the stop switch 51 is opened to restore the rebalanceable positional servo system to normal operation, that the servo motor rebalancing rate is limited by the integrating amplifier 22 to whatever speed of rebalance is desired and established by the magnitude of the resistor 21. For recording operations particularly, this is desirable in order to prevent overshoot of the recorder pen position.

Assuming that the servo system is at rest in a balanced condition, both the output of error amplifier 30 and the summing junction 23 at the input to integrating amplifier 22 will be at substantially ground potential. Under these conditions the operation of the stop switch 51 to its closed position will have no influence upon the system. Also, if no change occurs in the signal applied to input terminals 10 and 11 during the time that stop switch 51 is closed, there will be no change in the servo system when the stop switch 51 is opened.

On the other hand if, while the stop switch 51 is closed, the signal applied to input terminals 10, 11 should change, a signal voltage will appear across the signal limiting diodes 19, 20. This signal applied to resistor 21 will tend to change the voltage at the summing junction 23 of integrating amplifier 22. Such a change in voltage will be amplified by integrating amplifier 22 and error amplifier 30 and applied in a negative feedback sense to restore the summing junction 23 to substantially ground potential. Because of the high gain in amplifiers 22 and 30 and the large amount of negative feedback, the change in voltage necessary at the output of amplifier 30 to restore the input of amplifier 22 to ground potential is not large enough to cause motor 12 to operate. As previously stated, this feedback action maintains a substantially fixed voltage on integrating capacitor 25 throughout the time that stop switch 51 is closed.

If the stop switch 51 is opened at the time that an unbalance condition exists in the input rebalanceable loop circuit, i.e. the signal applied to the inverting input of amplifier 14 not equal in magnitude to the signal applied to the non-inverting input, the integrating amplifier 22 resumes its normal integrating action and its output begins to change in a ramp fashion at a rate determined by the magnitude of the resistor 21. The error amplifier 30 in response to the ramp signal applied to its non-inverting input will produce energization of servo motor 12 to produce a rebalancing action in the servo loop such that the rebalancing speed of servo motor 12 is determined by the rate of change of signal output from integrating amplifier 22 in avoidance of any abrupt change in position of servo motor 12.

What is claimed is:

1. A rebalanceable positional servo system comprising,
    a first rebalanceable loop having an input and an output wherein the output signal varies at a uniform preset rate to be proportional in magnitude to the signal applied to the input of said loop,
    a second rebalanceable loop system having an input connected to the output of said first rebalanceable loop and positioning an output element in accordance with the magnitude of the input signal, and
    a stop circuit arresting the movement of the output element comprising a negative feedback connection from said second loop to said first loop and including switching means for completing and interrupting said negative feedback circuit.

2. Apparatus as in claim 1 in which said first rebalanceable loop circuit includes an integrating amplifier.

3. Apparatus as in claim 2 in which said second rebalanceable loop system includes an error amplifier.

4. Apparatus as in claim 3 in which said negative feedback circuit extends from the output from said error amplifier to the input of said integrating amplifier.

5. Apparatus as in claim 4 in which said negative feedback connection includes a switching FET.

6. A null balance servo system including an improved stop circuit comprising;
    a source of an input signal,
    a first amplifying means having an input and an output with its input connected to said source of an input signal and a negative feedback connection from its output to its input.
    integrating means included in said first amplifying means, for establishing a maximum rate of change of signal at the output of said first amplifying means,
    a second amplifying means having an input and an output with its input connected to the output of said first amplifying means,
    a servo motor connected to the output of said second amplifying means,
    electromechanical feedback means coupled to said motor and producing a negative feedback signal to the input of said second amplifying means, and
    stop switching means having an open circuit and closed circuit condition connected from the output of said second amplifying means to said integrating means to provide a negative feedback signal when in said closed circuit condition from the output of said second amplifying means to said integrating means.

7. An improved stop circuit for a null balance positioning system having an input signal amplifying means including an integrating amplifier for limiting the rebalance speed of said system and an error amplifying means having an input connected to the output of said integrating amplifier and an output for controlling a rebalancing motor comprising;
    switching means connected between the output of said error amplifying means and the input of said integrating amplifier, and
    means to operate said switching means in one sense to provide a negative feedback path from said error amplifying means output to said input of said integrating amplifier to stop said rebalancing motor by reducing the gain of said error amplifying means and in the other sense to interrupt said feedback path to restore said system to normal operation and permit rebalance at said speed limited rate determined by said integrating amplifier.

8. A null balance servo system comprising;
    an input comparator amplifier for receiving and processing an input signal, having an inverting input terminal, a non-inverting input terminal and an output terminal,
    said input signal being applied to one of said two input terminals,
    an integrating amplifier having an input terminal and an output terminal,
    signal limiting means coupled between the output terminal of said input comparator amplifier and the input of said integrating amplifier for applying to said integrating amplifier a constant amplitude signal when said input signal exceeds a predetermined level,
    amplifier feedback means connected between the output terminal of said integrating amplifier and said non-inverting input terminal of said input comparator amplifier whereby the output signal at the output terminal of said integrating amplifier is related to said input signal and the rate of change of said output signal at the output terminal of said integrating amplifier is restricted by said signal limiting means,
    an error amplifier having an inverting input terminal, a non-inverting input terminal and an output terminal, said non-inverting input being connected to the output terminal of said integrating amplifier,
    a slidewire for generating a positional feed-back signal applied to said inverting input of said error amplifier,
    a balancing motor electrically coupled to the output of said error amplifier and mechanically coupled to said slidewire, and
    switch means for selectively applying a portion of the output signal at the output terminal of said error amplifier to said input terminal of said integrating amplifier for stopping said balancing motor and subsequently disconnecting said portion of the output signal at the output terminal of said error amplifier from said input terminal of said integrating amplifier for the resumption of said balancing motor operation without causing a step change in said slidewire position from said stopped position.

* * * * *